United States Patent [19]

McCormick et al.

[11] 3,794,982

[45] Feb. 26, 1974

[54] DATA ACQUISITION DEVICE

[75] Inventors: James B. McCormick; Radoslav T. Mijanovich, both of Hinsdale; Shunjiro Ohba, Chicago, all of Ill.

[73] Assignee: Pelam, Inc., Hinsdale, Ill.

[22] Filed: Apr. 17, 1972

[21] Appl. No.: 244,825

[52] U.S. Cl. .......................................... 340/172.5

[51] Int. Cl. .............................. G06f 3/08, G06f 3/14

[58] Field of Search .. 340/172.5; 35/9 R, 9 B, 48 R, 35/48 A, 48 B, 75; 353/25–27

[56] References Cited

UNITED STATES PATENTS

| | | | |
|---|---|---|---|
| 3,427,732 | 2/1969 | Wopart, Jr. | 35/48 R |
| 3,071,753 | 1/1963 | Fritze et al. | 340/172.5 |
| 3,585,597 | 6/1971 | Holmerud | 340/172.5 |
| 3,518,440 | 6/1970 | Hanson et al. | 35/48 R |
| 3,579,196 | 5/1971 | Gregg, Jr. | 340/172.5 |
| 3,570,146 | 3/1971 | Golden | 35/48 R |
| 3,613,269 | 10/1971 | Fujimoto | 35/48 R |
| 3,191,006 | 6/1965 | Avakian | 340/172.5 |

*Primary Examiner*—Harvey E. Springborn
*Attorney, Agent, or Firm*—Fitch, Even, Tabin & Luedeka

[57] ABSTRACT

A data acquisition device for recording information supplied by an operator in response to a plurality of questions visually presented to the operator in a predetermined sequence has a slide projector and mirror system for visually displaying a sequence of slides on a screen readily observable by the operator. Each slide bears an image frame having a question, multiple-choice answers, and an identification code photographically recorded thereon. The operator selects and actuates a switch corresponding to the desired answer and the device automatically records information corresponding to the answer on a punch card at the location or column on the card associated with the particular frame being projected. Digital logic is utilized to compare the identification code with the card column to synchronize the visual display with the punch card recording of the answers, as well as to provide safety features which render the operation of the device relatively foolproof.

16 Claims, 12 Drawing Figures

FIG. 6 FUNCTION CONTROL CIRCUIT

SEQUENCE DECODER CONTROL AND INHIBITING CIRCUIT

DECIMAL DATA ENTRY (KEYBOARD CIRCUIT)

FIG. 10 CARD/SLIDE COMPARATOR AND DISPLAY CIRCUIT

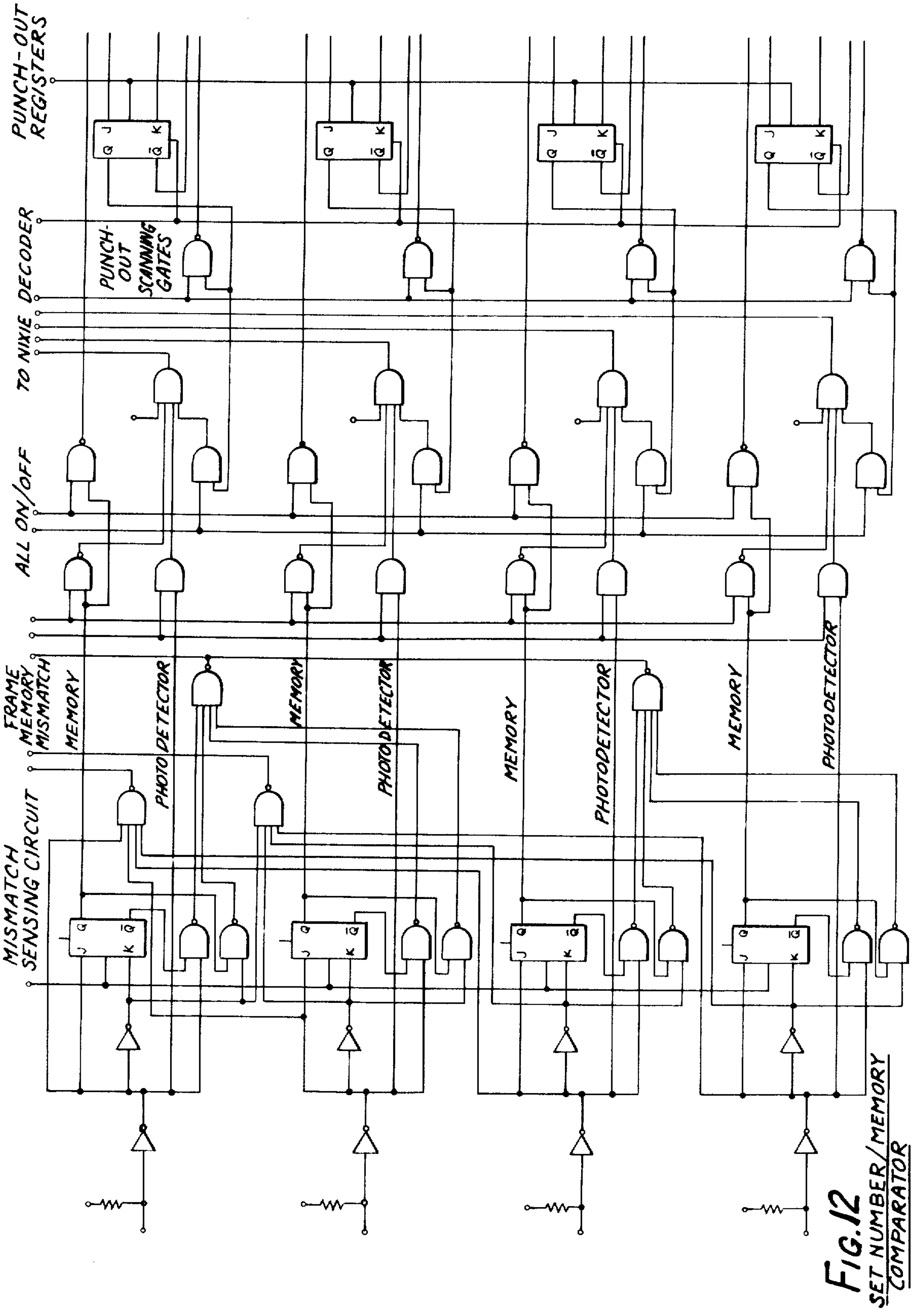
FIG. 12 SET NUMBER/MEMORY COMPARATOR

DATA ACQUISITION DEVICE

The present invention generally relates to data acquisition devices and, more particularly, to such devices which are operable to record information in response to a visually displayed sequence of communications such as questions.

With the generally wide-spread use of relatively large amounts of data and the increasing use of computers to analyze data, there is a need for a simple, reliable, and relatively inexpensive device for accurately and efficiently obtaining data from individuals. Many aspects of contemporary human life are affected by the taking of data in the form of written questionnaires, personal interviews, and the like for purposes ranging from credit reports to medical histories to employment interviews. Quite obviously, it is desirable to maximize the accuracy of the data obtained and minimize the cost of obtaining it. To reduce the amount of man-hours required to obtain such information as well as to increase the legibility and reliability thereof, and to place it in a more suitable form for computer analysis, some conventional approaches have proposed the use of programmed machines to ask the desired questions and either record the responses thereto or trasmit them to a remote data processing data. Generally, such machines have been too complex and expensive for extensive utilization, especially in businesses limited to relatively low operating or "overhead" expenses such as doctors' offices, for example.

It is therefore an object of the invention to provide an improved data acquisition device which is relatively simple to operate and economical to manufacture.

It is another object of the invention to provide such a device which operates with a relatively high degree of reliability and integrity.

Other objects and advantages of the invention are more particularly set forth in the following detailed description, and in the accompanying drawings, of which:

FIGS. 5 through 12 are electrical schematic logic diagrams of a particular embodiment of the circuit functionally represented by the block diagram of FIG. 3.

Figures 1, 2, 4:
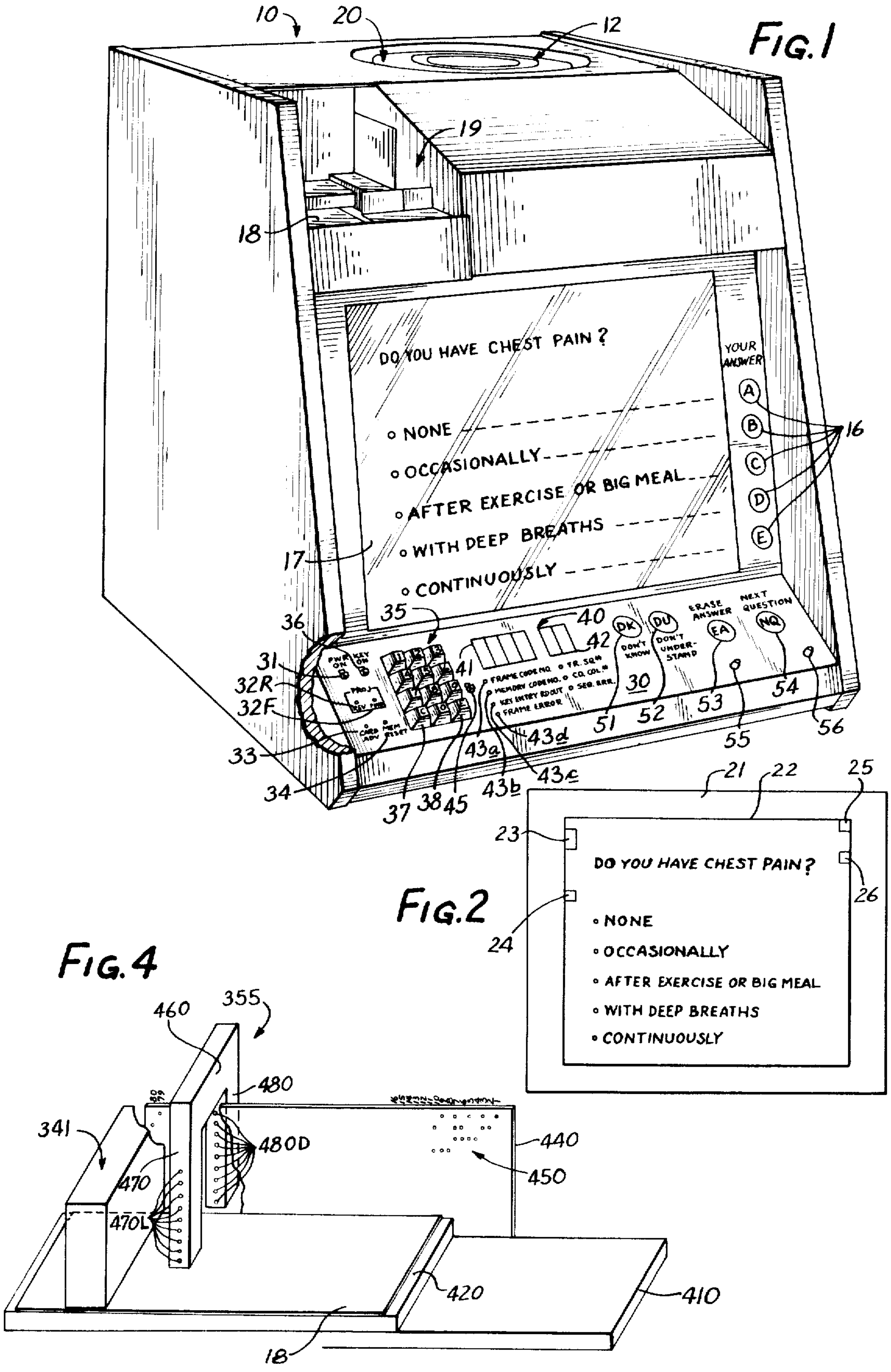
FIG. 1 is a perspective view of a data acquisition device constructed in accordance with the principles of the invention.
FIG. 2 is a front elevational view of a component of the visual display means utilized in the embodiment of the invention shown in FIG. 1.
FIG. 4 is a view of a preferred embodiment of a card position sensor constructed in accordance with one aspect of the invention.

With respect to FIG. 1, there is shown a data acquisition device or system 10 for recording information supplied by an operator (not shown) in response to a plurality of communications (e.g., questions) visually presented to the operator in a predetermined sequence. In the illustrated embodiment of the invention, generally, the sequence of questions is visually displayed by means of a slide projector 12 which projects a series of slides 20 (an example 21 of which is shown in FIG. 2) onto a viewing screen 17. Each slide bears a transparency or image frame having a question and four or five multiple-choice answers thereon together with coded information identifying the particular frame. The operator reads the displayed question and then selects his answer(s) by pushing one or more of pushbutton switches 16 each of which, for convenience, is located adjacent to one of the multiple-choice answers displayed. He then registers his answer in device 10 by pushing a "next question" button 54, which also causes the slide projector to advance to the next slide in the sequence. The answers are then permanently recorded at a predetermined location on a recording medium illustrated here in the form of a Hollerith or "punch" card 18 which is inserted in a card punch accessible through opening 19, as hereinafter described in greater detail with reference to FIG. 4. Should there for some reason be a discrepancy between the question being answered and the particular location on the recording medium where the answer is to be recorded, the device of the invention prohibits registration of the answer and further operation of the device so that only answers to questions in the proper sequence are recorded. A control panel 30 is provided on the front of device 10 below screen 17 as shown to enable various operations of the device to be performed as well as to indicate different internal operational conditions, as also described in greater detail below.

More particularly, the embodiment of the invention illustrated in FIG. 1 comprises a left-hand portion of control panel 30 of data acquisition device 10 which includes a power on/off switch 31, projector control switches 32R (reverse) and 32F (forward), a card advance switch 33, and a memory reset switch 34 (discussed in greater detail below with reference to FIG. 3). A decimal keyboard 35 is provided in accordance with an optional aspect of the illustrated embodiment of the invention for entering quantitative information such as answers to questions which are not readily adaptable to a multiple-choice format (e.g., "What is your age?"). If desired, of course, keyboard 35 could be a suitable alpha-numeric type instead of decimal. A keyboard on/off switch 36 is provided for activating the internal circuitry associated with keyboard 35. A "clear" switch 37 enables the operator to change the digital input data he has selected before it is registered in device 10 by an "enter" switch 38. A digital readout display system 40 enables the operator to verify the digital data he selected with keyboard 35 before he depresses button 38.

In the illustrated embodiment of the invention, digital readout display system 40 comprises a four-digit section 41 and a two-digit section 42. Directly below four-digit section 41 are four lamps 43*a*, 43*b*, 43*c*, and 43*d*. When illuminated, lamps 43*a*, 43*b*, and 43*c* respectively indicate that digital readout 41 is displaying the frame code number, memory code number, or the data entered by the keyboard. Lamp 43*d* is illuminated to indicate an error whenever the frame code number and the memory code number do not correspond. Similarly, directly below two-digit readout 42 are a group of three lamps 44*a*, 44*b*, and 44*c* which, when illuminated, respectively indicate that digital readout 42 is displaying the frame sequence number, the card column number, or an error whenever the frame sequence number does not correspond to the card column number. A mode-selection switch 45 is provided to enable selection of either the operational mode in which digital readouts 41 and 42 display the frame code number and frame sequence number, respectively, or the operational mode in which digital readouts 41 and 42 display the memory code number and card column number, respectively. When digital keyboard 35, and the internal circuitry associated therewith, is activated by turning on keyboard switch 36, digital readout 41 displayed the digital data selected by means of keyboard 35.

The right-hand portion of the control panel 30 comprises four pushbutton switches which the operator depresses when he does not know the answer (switch 51), does not understand the question (switch 52), desires to change his answer before it is registered in the device (switch 53), or desires to register his answer and go on to the next question (switch 54). A warning light 55 is illuminated whenever there is a frame sequence error, frame number error, or a malfunction in device 10. An "identification and advance" button 56 is provided for enabling the operator to go on to the next slide after viewing a frame which is merely explanatory and does not require an answer.

In accordance with the illustrated embodiment of the invention, the frame code number designates a particular group or set of sequential image frames and the frame sequence number designates the relative position of the frame in the sequence. Thus, each slide bears an image frame having coded information, such as in the form of optically coded indicia, identifying both the question set to which it belongs and its relative order therein. The memory code number is the code number of the last frame displayed prior to the instant frame. When memory reset button 34 is pressed or when a new punch card is inserted, however, the memory code number is then the code number of the instant frame. The card column identifies the particular location or column or the Hollerith card which is in alignment with the recording transducer (i.e., the tool and die) of the card punch (see FIG. 4) and, therefore, in position to have coded holes (or some equivalent thereof) punched therein and thus store information corresponding to the operator's answer to the displayed question. Should the frame code number not correspond to the memory code number, or the frame sequence number not correspond to the card column number, the device of the invention inhibits the card punch to thus prevent the recording of answers to anomalous questions.

With respect to FIG. 2, there is shown a photographic slide 21 which may be utilized in the embodiment of the invention shown in FIG. 1. Slide 21 bears an image frame 22 for visually displaying a question (e.g., "Do you have chest pain?") and a group of multiple-choice answers (e.g., "none," "occassionally," "after exercise or a big meal," "with deep breaths," and "continuously"). The illustrated embodiment has the right and left-hand margins of frame 22 coded in a binary-coded-decimal format to identify the frame. The left-hand margin is coded with the frame code number by making the margin opaque except for portions 23 and 24, for example, which are made transparent to thereby transmit a coded optical signal which is detected by a plurality of photoelectric detectors 351 (see FIG. 3) which are positioned in device 10 on the corresponding side of the viewing screen. Similarly the right-hand portion of frame 22 is coded with the frame sequence number by making the margin opaque except for portions 25 and 26, for example, which are made transparent to thereby transmit a corresponding coded optical signal. The coding may also be carried out using the inverse light relationship wherein the margins are made transparent except for the code portions which are made opaque and the photodetectors detect the absence of light to determine the coded information. The printed information in the center of the frame (the question and answers) may also, of course, be presented in either photographic relationship and the coded information may be located at the top and bottom portions of the frame is desired. Furthermore, in some applications, various color combinations may be used as a substitute for or in addition to a transparent/opaque format and suitable codes other than binary-coded-decimal may be employed.

Figure 3:
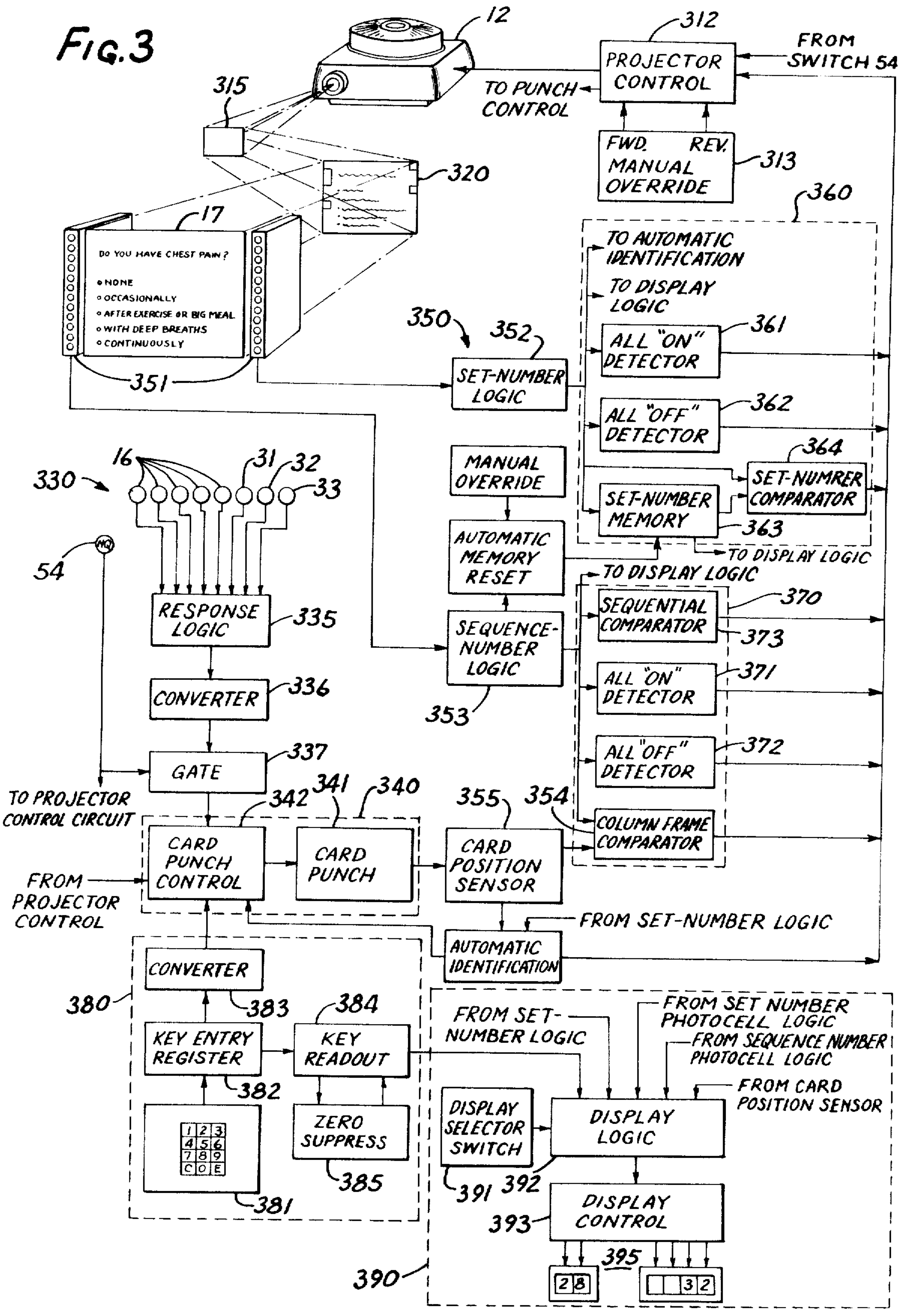
FIG. 3 is a block diagram functionally representing the general operation of an embodiment of the invention which may be advantageously employed in the device shown in FIG. 1.

With respect to FIG. 3, there is shown a block diagram of a particular embodiment of the system of the invention including the electronic circuitry which may be advantageously employed in device 10 of FIG. 1. In general, the system comprises means for visually displaying questions in a predetermined sequence including a slide projector 12, a projector control circuit 312 and manual override circuit 313, an image-reflecting system including two mirrors 315 and 320, and a viewing screen 17 upon which the question and answer information is displayed. The mirror system enables a more compact projection of the image frames by affording an effectively longer projection distance between the projector and the screen within a given, relatively short space. Answer registration means adapted to ermit an operator (not shown) to register answers to the questions comprises a plurality of pushbutton switches 330, which correspond to the five multiple-choice buttons 16 and the four additional answer buttons 51-54 of device 10 shown in FIG. 1, and digital response logic 335 for retaining the answer in the device in a parallel binary digital signal format. A parallel to serial binary converter 336 changes the format of the digital signal representative of the answer and applies it to a gate 337. Recording means 340 includes a card punch assembly 341 (see FIG. 4), having a recording transducer in the form of at least one punch and die combination and a card punch control circuit 342, and is responsive to the digital answer signal for recording answer information on the recording medium, which in this specific embodiment of the invention is a punch card (see FIG. 4). Card punch 341 is operable to position the punch card at a plurality of predetermined locations relative to the recording transducer so that the information is recorded at a location uniquely associated with the particular question in the sequence being answered by the operator. Synchronizing means 350 for synchronizing the recording medium movement with the visual display means includes a plurality of photoelectric detectors 351, a set number logic circuit 352, a sequence number logic circuit 353, a column-frame comparator 354, and a card position sensor 355. Additional logic circuitry including circuits 360 and 370 provides certain operational safeguards as described in greater detail below. A data entry system 380, including a keyboard 381 similar to keyboard 35 of device 10 in FIG. 1, provides for the entry of digital answer data. Another aspect of the illustrated embodiment of the invention comprises a digital display circuit 390 which provides a numerical readout of certain information in the system.

More particularly, the specific embodiment of the invention shown in FIG. 3 enables an operator to register answers to the displayed questions by means of the pushbutton switches 330, the multiple-choice answers being selected by pushbutton switches 16 and the other answers ("don't know," "don't understand," "erase answer," and "next question") being registered by pushbutton switches 51, 52, 53, and 54, respectively. All of the answer pushbutton switches except "next question" switch 54 are coupled to the system through response logic 335 which develops a different digital signal for each answer in response to the contact closure of the associated pushbutton switch. Converter 336 converts the digital answer signals to a signal suitable for card punch control 342 (e.g., from binary-coded decimal to parallel binary). Gate 337 is interposed between code converter 336 and card punch control circuit 342 and is responsive to the contact closure of "next question" switch 54 to pass the digital answer signal to card punch control circuit 342, whereupon information corresponding to the registered answer is recorded on card 18 by card punch assembly 341 (FIGS. 1 and 4) in the form of a coded array of punched holes. Thus, the operator may select one or more answers or even erase his answer and change it without the information being punched on the card. The contact closure of "next question" switch 54 also applies a signal to projector control circuit 312 to cause projector 12 to advance the next slide in the magazine or slide series 20 for projection on screen 17. Projector control circuit 312 also applies a signal to card punch control circuit 342 to advance the carriage of card punch 341. Card position sensor 355 determines which card column (a typical Hollerith punch card has 80 columns) is in alignment with the punch tool and die and applies a signal indicative thereof to card/slide comparator 354, as described below in greater detail with reference to FIG. 4.

Photoelectric detectors 351 are positioned on both sides of the screen 17 to detect the coded information on corresponding sides of the projected image frame as discussed above with reference to FIG. 2. In the illustrated embodiment of the invention, photoelectric detectors 351 comprise photoresistors although any other suitable photosensitive means may be employed if desired. For photoresistors, whose resistance generally decreases when exposed to light, the signals may comprise a group of voltages having either a preselected "high" or "low" value depending on the state (exposed or unexposed) of the respective photoresistor. The outputs of photoelectric detectors 351 are coupled to set-number logic 352 and sequence-number logic 353.

Set-number logic 352 converts the photoelectric detector output signals, which correspond to the code number of the particular set or sequence of questions being presented, into a digital logic signal representative thereof. The digital logic signal from set number logic 352 is coupled to a security logic circuit 360 which includes a number of detector circuits having their output signals coupled to projector control circuit 312 for inhibiting projector 12 in response to the detection of any one of a plurality of undesirable or improper operating conditions. Accordingly, an "all on" detector 361 senses the condition of all of the set-number photoelectric detectors being activated (i.e., in the conductive operating state) which usually means that no slide is in the particular magazine position aligned for projection. When such a condiion is sensed, detector 361 applies an "advance" signal to projector control circuit 312 to cause projector 12 to advance to the next slide position in the magazine. Similarly, an "all off" detector 362 senses when none of the set-number photoelectric detectors are activated (i.e., in the non-conductive operating state) which usually means that the slide is improperly inserted in the magazine or that there is a foreign object interfering with the projection of the slide. Detector 362, in such a situation, applies an "inhibit" signal to projector control circuit 312 to prevent projector 12 from advancing so that the problem may be corrected before the operation of device 10 proceeds. To further insure the accuracy or integrity of the system, in accordance with the illustrated embodiment of the invention, projector control 312 applies an "inhibit" signal to punch control circuit 342 whenever it receives an inhibit signal so that no information can be recorded by card punch assembly 341 when the system is not operating properly. The output signal of set-number logic 352 is also coupled to another "detector" comprising a set-number memory 363 and a set-number comparator 364. Set-number memory 363 stores the coded set number of the previous slide and applies that signal to set-number comparator 364. Comparator 364 is responsive to signals representing the coded set number of both the present slide and the immediately preceding slide to develop an output signal indicating whether or not the two signals are equivalent; that is, if the set code number of the slide shown just prior to the then presently-shown slide does not compare with that of the then presently-shown slide, set-number comparator 364 applies an error or "inhibit" signal to projector control circuit 312 to maintain projector 12 (and thus card punch assembly 341) in its present position until the problem can be corrected. Thus the device of the illustrated embodiment of the invention prohibits the recording of an answer to a question that does not belong in the set of questions being asked.

Similarly, sequence-number logic 353 converts the output signals from the portion of photoelectric detectors 351 corresponding to the sequence number of the slide to a digital logic signal representative thereof and applies the digital signal to security logic circuit 370. Security logic circuit 370, similar to security logic circuit 360, includes an "all on" detector 371 to sense the condition of all the sequence-number photoelectric detectors being activated (i.e., in the conductive operating state) and an "all off" detector 372 to sense the condition of none of the sequence-number photoelectric detectors being activated (i.e., in the non-conductive operating state). A sequential comparator circuit 373 determines if the slide being displayed is in the proper sequence by comparing its frame sequence number with that of the previous slide. By making the frame sequence code number change by only one digit from one image frame to the next, a relatively simple comparator circuit may be employed for sequential comparator 373. For example, an adder circuit may be employed such that as long as the frame sequence code number of the presently-shown slide is one code digit greater than that of the next-previously-shown slide, sequential comparator 373 has no output signal; otherwise, sequential comparator 373 develops an "inhibit" output signal which is applied to projector control circuit 312 to prevent projector 12 from advancing and card punch assembly 341 from recording any answers. A column-frame comparator circuit 354 is responsive to the digital output signal from sequence number logic 353 and card position sensor 355 to determine whether or not they correspond. Whenever the card column number does not correspond to the frame sequence number, column/frame comparator 354 develops an error or "inhibit" output signal which is applied to projector control circuit 312 to prevent projector 12 from advancing and card punch 341 from recording any answers.

Another aspect of the illustrated embodiment of the invention comprises an optional data input circuit 380 for entering specific numerical data in response to questions not readily answerable in a multiple-choice format or for enabling additional data such as identification numbers or codes to be entered. Data entry circuit 380 includes a numeric keyboard 381 for enabling the operator to register numerical answers or information into the system of the invention. Keyboard 381 may comprise any conventional device suitable for this application including, for example, a solid-state construction utilizing the Hall effect and permanent magnets attached to the pushbuttons of the keyboard to produce an impulse signal when a pushbutton is depressed. A key entry register circuit 382 retains a digital signal representative of the input data from keyboard 381 and applies it to a converter 383 which converts the digital signal from a parallel binary-coded-decimal format to a serial-binary format suitable for application to card punch control circuit 342. A keyboard readout circuit 384 is provided for developing a numerical display signal, as discussed below in greater detail. A zero suppress circuit 385 eliminates all zeros preceding the data from the display signal; that is, for a numerical entry of "32," for example, the two zeros preceding "32" in a four-digit readout are eliminated or "suppressed."

In accordance with another aspect of the illustrated embodiment of the invention, an optional digital display circuit 390 is provided for generating a digital readout of various information in the system, as discussed above with reference to FIG. 1. Digital display circuit 390 includes a display selector switch 391 for selecting the particular numerical data to be displayed. For convenience, display selector switch 391 may be mechanically coupled to keyboard switch 36 and switch 45 of device 10 illustrated in FIG. 1. Display logic 392 is responsive to digital input signals from keyboard readout circuit 384, set-number memory 363, set-number logic 352, sequence-number logic 353, and card position sensor 355 to convert them to a signal suitable for application to display control circuit 393. Display control circuit 393 is responsive to the logic signal from display logic 392 for activating digital readout devices 395 which may, for example, comprise a group of six "nixie" readout tubes. For purposes of efficiency, display control circuit 393 may be of the known type which rapidly scans the nixie tubes sequentially so that each tube is turned on only for a short period of time, relying on the persistence of the human eye to make the diaply appear continuous. This eliminates the need for a separate display logic circuit for each tube.

An automatic identification circuit 343 may be provided in accordance with another aspect of the illustrated embodiment of the invention to cause the information identifying the frame set number, for example, to be automatically recorded on the punch card. In the specific embodiment of the invention illustrated in FIG. 3, automatic identification circuit 343 is responsive to a predetermined card position, as indicated by a corresponding signal from card position sensor 355, to apply a signal to card punch control circuit 342 representative of the digital signal from set-number logic 352 (i.e., the set or frame code number). The predetermined card position (i.e., column number) may be chosen such that a preselected number of card columns are allocated to information punched in the card prior to the actual questioning (e.g., patient identification, location of the device, etc). The card is then placed in the data acquisition device and, after the display of some preliminary explanatory picture frames the last of which instructs the patient to push "identification and advance" button 56, automatic identification circuit 343 causes card punch control circuit 342 to actuate card punch assembly 341 to record the frame code number on the card and then advance the projector to the frame bearing the first question and advance the card punch to the corresponding card column. As a further safeguard, automatic identification circuit 343 also applies an "inhibit" signal to projector control circuit 312 to prevent the projector and card punch from operating until after the frame code number is punched on the card.

With reference to FIG. 4, there is shown a card position sensor 355 which may be advantageously employed with card punch assembly 341 in the embodiment of the invention illustrated in FIG. 3 and which is generally located behind opening 19 of device 10 shown in FIG. 1. Card punch assembly 341 is shown symbolically because the details of the particular punch assembly employed form no part of the present invention and any conventional card punch suitable for coding a Hollerith card with an array of holes in response to the application of predetermined electrical signals (or a suitable equivaent thereof) may be used. In addition, the card punch assembly may be of the type that automatically advances the card carriage one column after each punching operation. Card position sensor 355 comprises a base portion 410 upon which a carriage portion 420 slides. Carriage 420 supports a recording medium in the form of a Hollerith or so-called "IBM" punch card 18 and positions it in punch assembly 341 in a predetermined relation thereto suitable for the punching of a coded array of holes in card 18. In accordance with this aspect of the illustrated embodiment of the invention, a plate 440 having a series of holes 450 therein arranged in a binary-coded-decimal fashion to signify the columns of card 18 is affixed to carriage 420 and travels therewith through a yoke member 460 of card position sensor 355 which has a light-emitting portion 470 and a light-detecting portion 480. Light-emitting portion 470 comprises a series of lights 470L embedded therein for emitting light in a direction toward light-detecting portion 480 which has embedded therein a corresponding series of light detectors 480D (such as photoresistors) for detecting light emitted by light-emitting portion 470 and passed through holes 450. Light detector 480D thus develops an electrical signal representative of the card column that is positioned adjacent the recording transducer (i.e., the tool and die portion) of punch assembly 341. This electrical signal is applied to column/frame comparator circuit 354 for comparison therein with an electrical signal corresponding to the frame sequence number of the picture presently being displayed by device 10, as described above with reference to FIG. 3.

Figure 5:
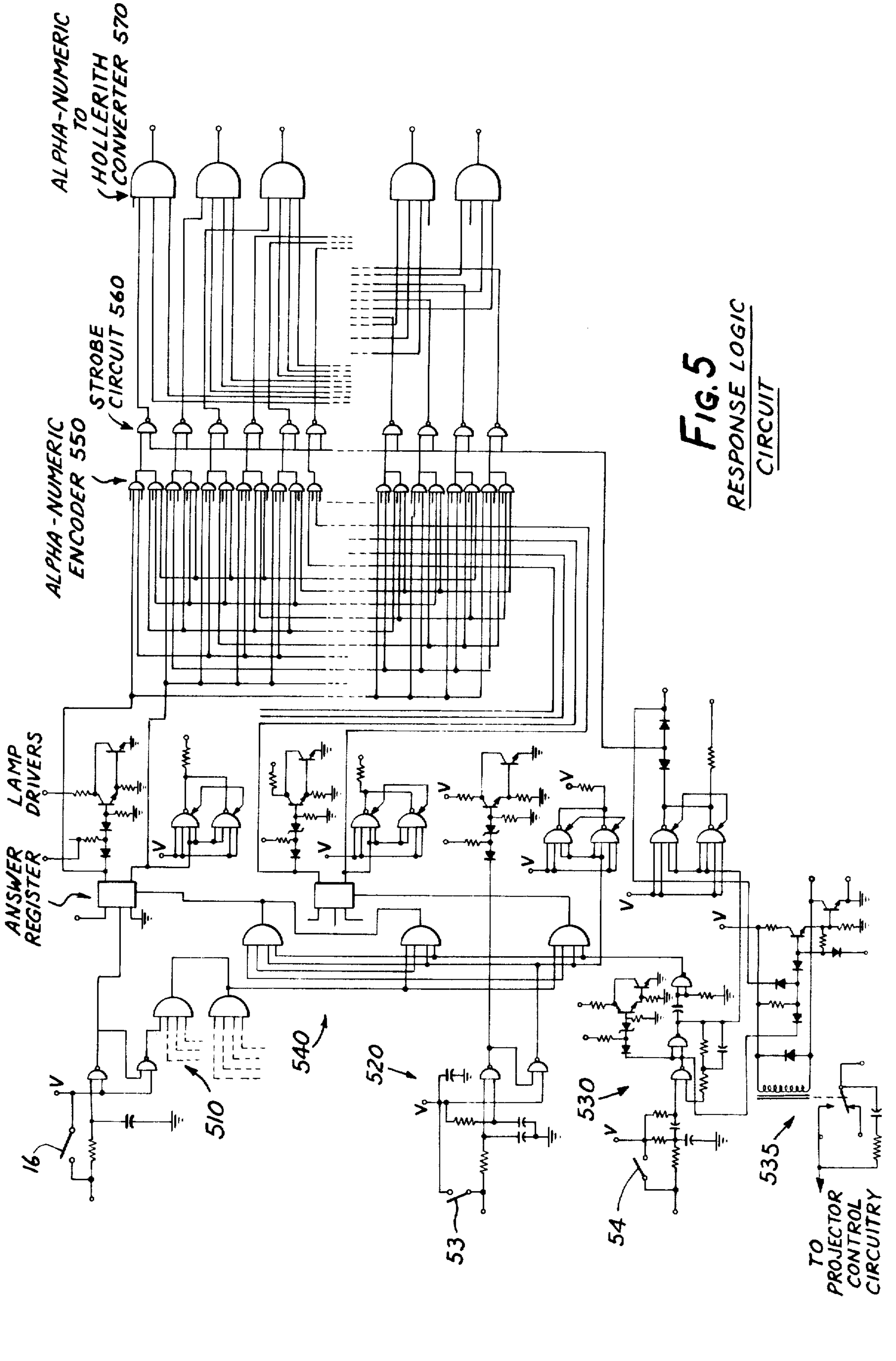

With respect to FIG. 5, there is shown a schematic logic diagram of response logic 335 of FIG. 3. It is understood that in FIG. 5, as well as in FIGS. 6–12, the illustrated logic diagram representing a specific embodiment of the invention and is only briefly described because of the permutable characteristic of digital circuitry; that is, generally there are many different ways known to those skilled in the digital circuitry art to combine AND gates, NAND gates, NOR gates, etc., to achieve a desired result and typically one of the primary design considerations is the availability of low cost components. Quite often, a relatively large number of digital circuit components are formed on a single substrate or "chip" and a particular chip may be manufactured in such relatively large quantities that it is more economical to design a circuit using such an existing chip rather than to design a new chip employing fewer actual digital components because of the designing and manufacturing costs of developing the latter. Thus, for example, for a circuit function obtainable with five AND gates it may be more economical to use 25 NAND gates on an existing chip instead of five AND gates on a new chip. Sometimes this results in a circuit that does not utilize all of the components on a particular chip, with some terminals thereof not being connected to the circuit. In addition, this factor plus other design considerations, such as the employment of certain components of one part of the system to perform a function in another part of the system, sometimes results in a circuit the schematic diagram of which does not "fit" into a functional block diagram. Consequently, although the block diagram of FIG. 3 functionally represents the operation of the actual circuits of the specific embodiment of the invention illustrated in FIGS. 5 through 12, the specific circuits illustrated may not conveniently fit into the blocks. Of course, if desired, circuitry could be built in a straight forward manner with conventional design techniques to fit each block.

In order to simplify the drawing, only a portion of the response logic circuitry is shown in FIG. 5 because it is substantially identical to that portion of the circuitry not shown. In general, an impulse signal caused by the contact closure of one of answer switches 16 is applied to NAND gate networks 510 and 540 wherein a corresponding digital signal is developed and retained in the answer register. The input circuitry (not shown) for each of the remainlng four answer switches 16 (shown in FIGS. 1 and 3) is substantially identical to that shown. Similarly, digital input circuitry 520 for switch 53 ("erase answer") is shown which develops a digital signal that resets or "clears" NAND gate networks 510 and 540 to permit a different answer signal to be registered therein. The digital circuitry 530 for "next question" switch 54 is shown and it should be noted that, in this specific embodiment of the invention, the function of gate 337 of FIG. 3 is performed by having the output signal of circuitry 530 produce an enabling signal in response to the contact-closure of switch 54. The enabling signal is coupled to NAND gate circuitry 540 to pass the digital answer or information signal retained therein to the card punch control circuit. The output signal of circuitry 530 is also applied to a relay circuit 535 to develop a signal which is applied to projector control circuit 312 of FIG. 3 to cause the projector tO advance to the next slide. The digital signal registered in NAND gate networks 510 and 540 is converted to a parallel binary format by an alpha-numeric encoder comprising AND gate circuitry 550, a strobe circuit comprising NAND gate circuit 560, and an alpha-numeric to Hollerith converter comprising AND gate circuitry 570.

Figure 6:
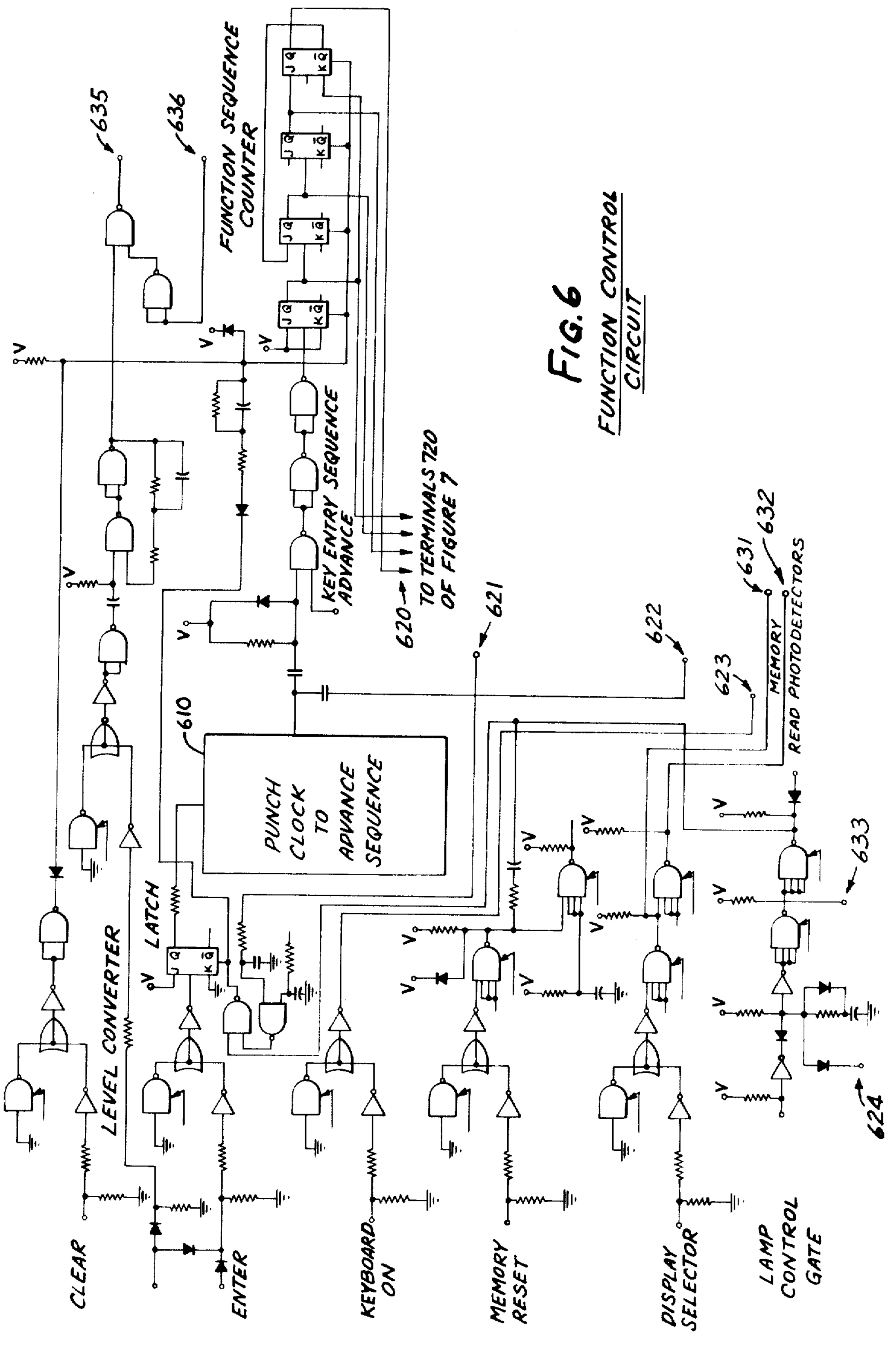
Figure 7:
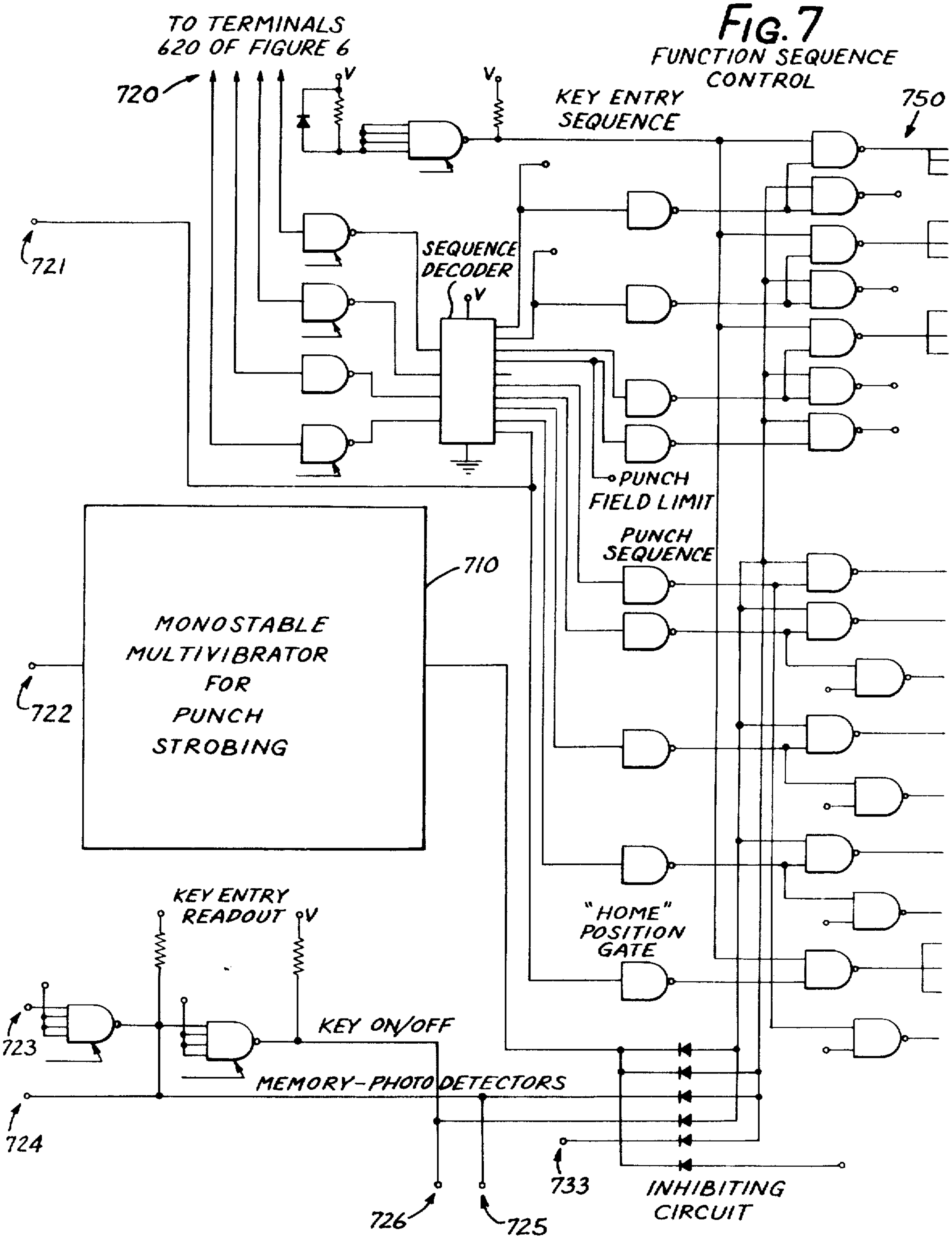

With respect to FIGS. 6, 7, 8, and 9 there is shown a schematic logic diagram of the function control circuitry including card punch control circuit 342 of FIG. 3. Because of its size, the complete circuit is shown in four FIGS. instead of one and terminals 621, 622, etc. of the circuit illustrated in FIG. 6 are connected to terminals 721, 722 etc. of the circuit illustrated in FIG. 7 and the like with respect to the remaining FIGURES.

Figure 8:
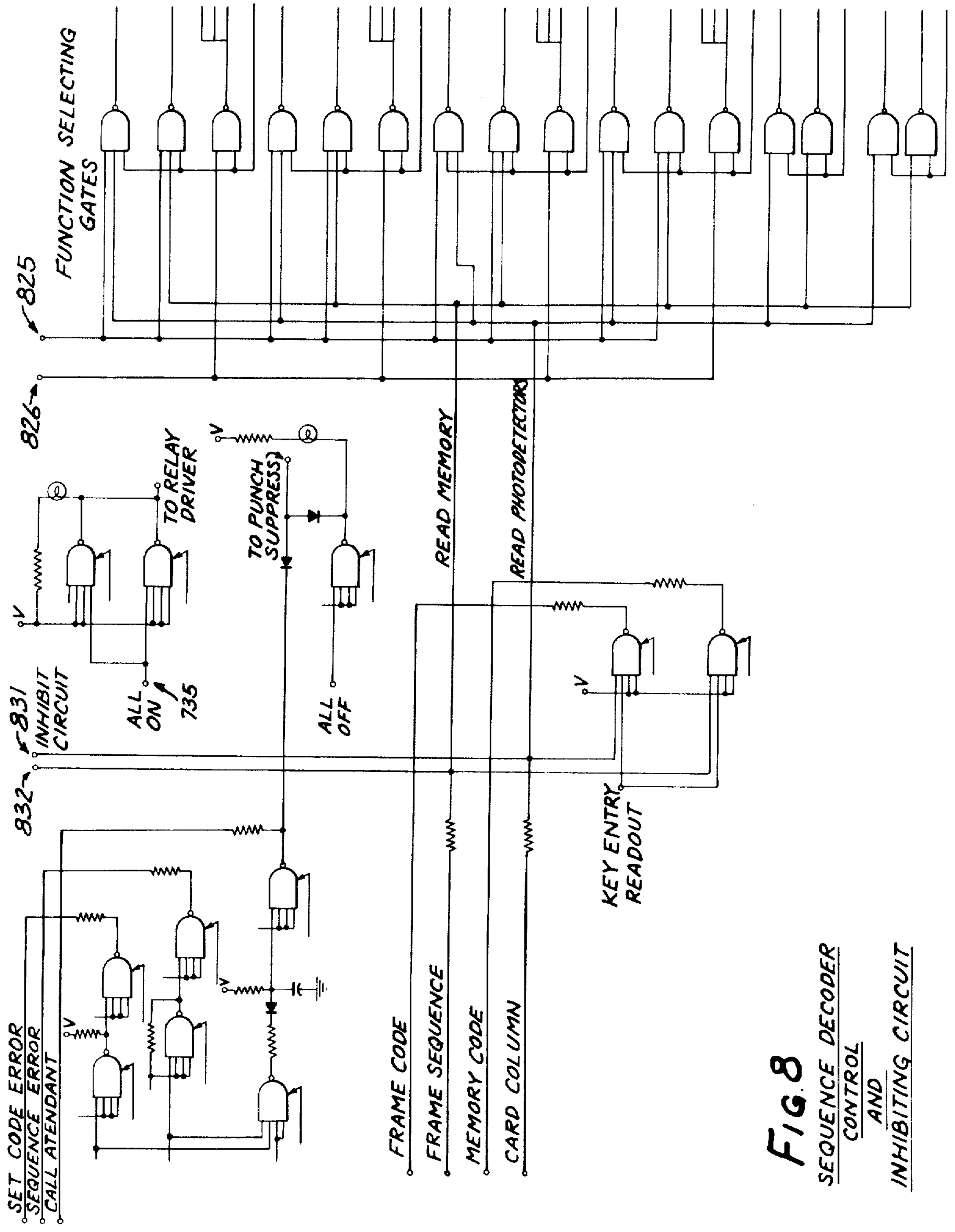
Figure 9:
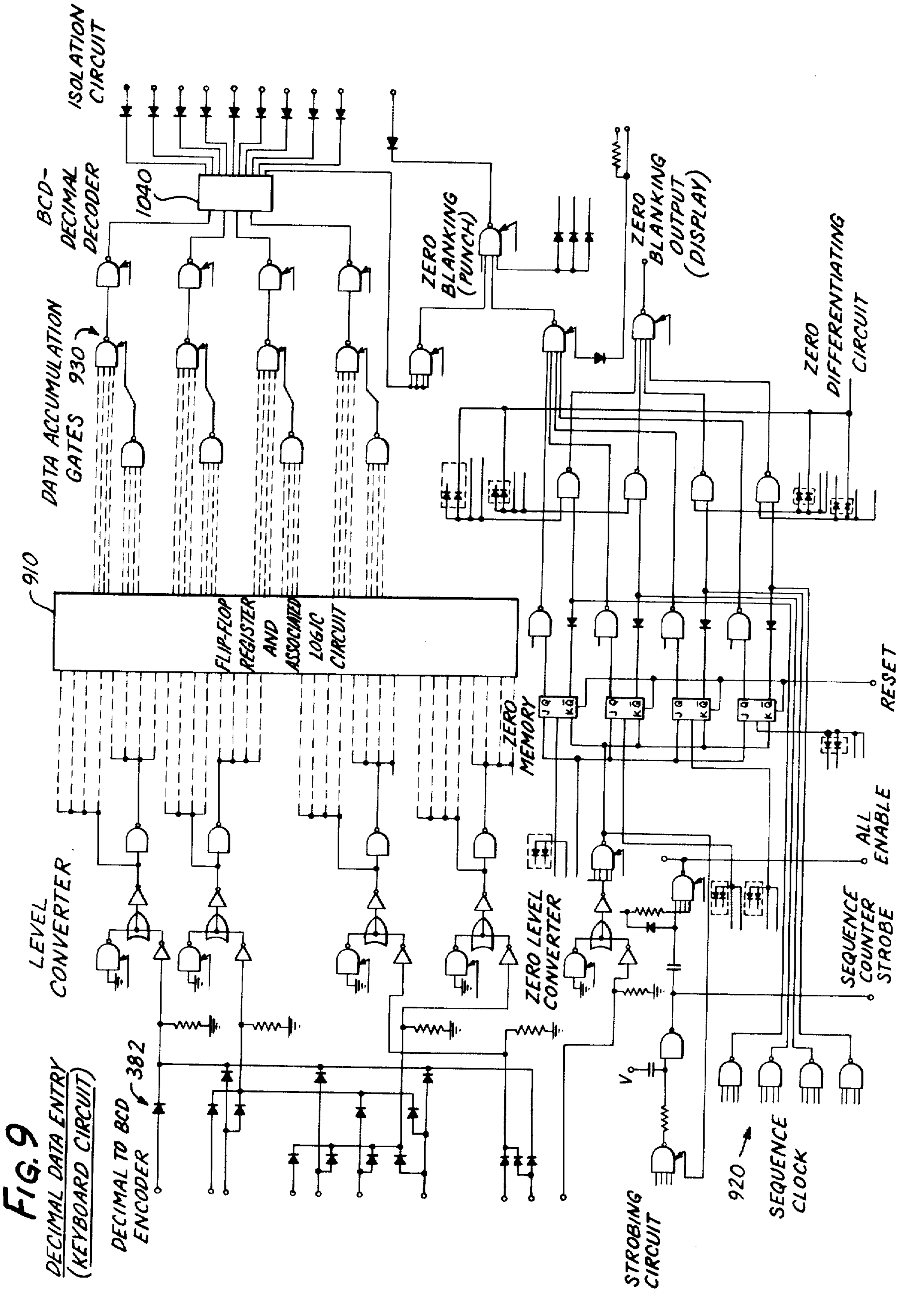

In FIG. 6 the logic circuitry is shown for some of the card punch control circuits including a portion of the function selection and control circuitry for data entry circuit 380 of FIG. 3 and some of the controls on panel 30 shown in FIG. 1. A network of NAND gates, OR gates, inverters, and J-K flip-flops is employed as shown to perform the logic functions. A clock 610, which may comprise a fixed-frequency astable multivibrator, is used to generate a timing signal to synchronize the operation of the various circuit components. The function sequence control circuitry shown in FIG. 7 includes a monostable multivibrator 710 used to drive the card punch and comprises that portion of the card punch control circuit used to determine the sequence of the individual transducers or punch dies of the card punch. FIG. 8 illustrates the sequence decoder control and inhibiting circuitry including the function control circuitry used to signal the set number error, sequence number error, etc., as well as to control (i.e., inhibit) the operation of the punch and projector. In FIG. 9 the decimal data entry (keyboard) circuit 382 is shown which converts the decimal input data into a binary-coded-decimal (BCD) format which is retained in a flip-flop register 910. The inputs to the networks of NAND gates 920 and 930 are taken from the outputs 750 of the circuit illustrated in FIG. 7 and the outputs 850 of the circuit shown in FIG. 8. A decoder 940 converts the binary-coded-decimal signals to decimal signals which are available at outputs 950.

Figure 10:
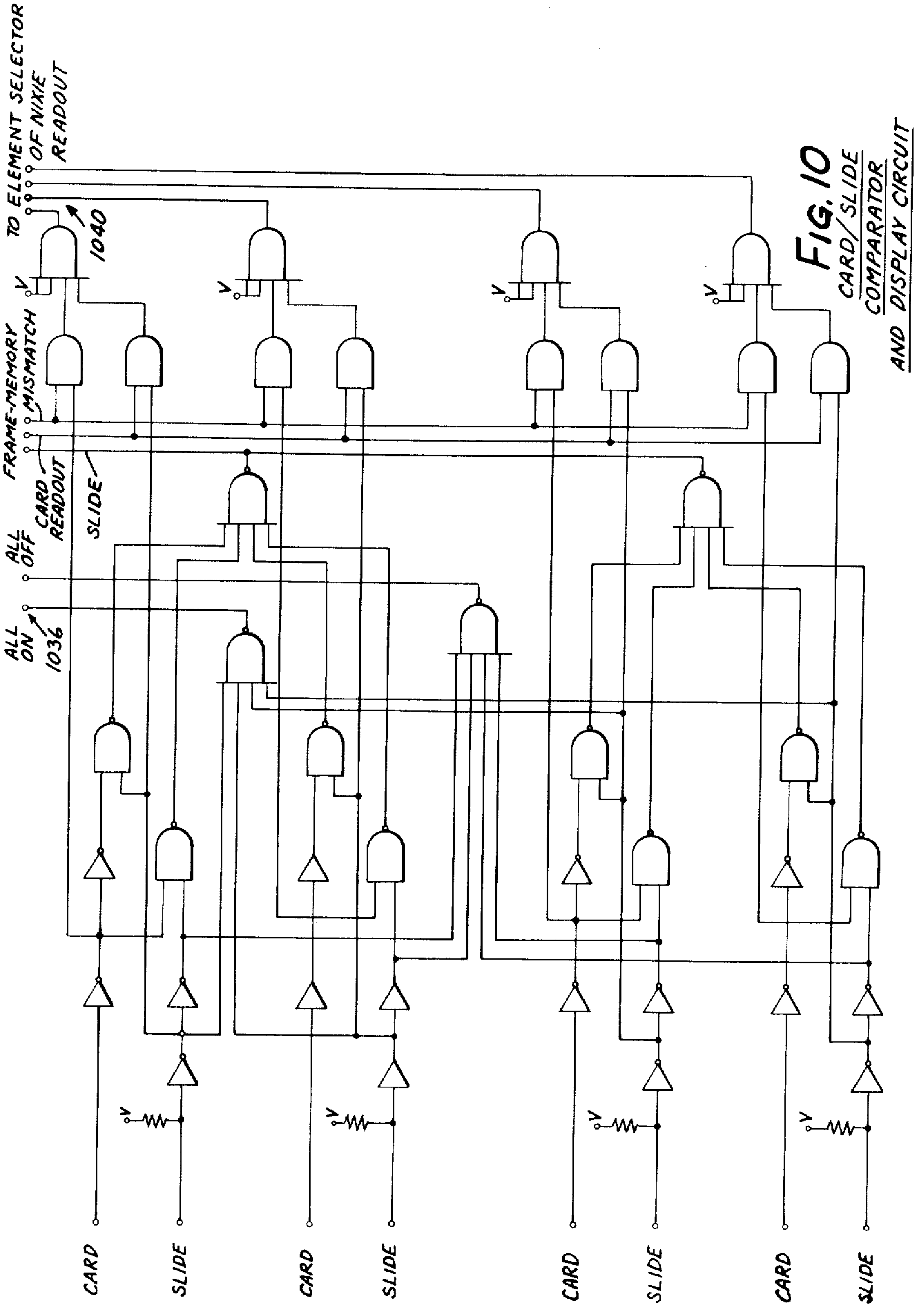

FIG. 10 illustrates a circuit comprising a network of NAND gates and inverters which may be used for one unit or digit of column/frame (card/slide) comparator 354 of FIG. 3 and for providing readout information at outputs 1040 which are coupled to the element selector circuitry 1140 for the "nixie" readout tubes (not shown). Substantially identical circuits (not shown) may be utilized for the remaining five digits of the system.

Figure 11:
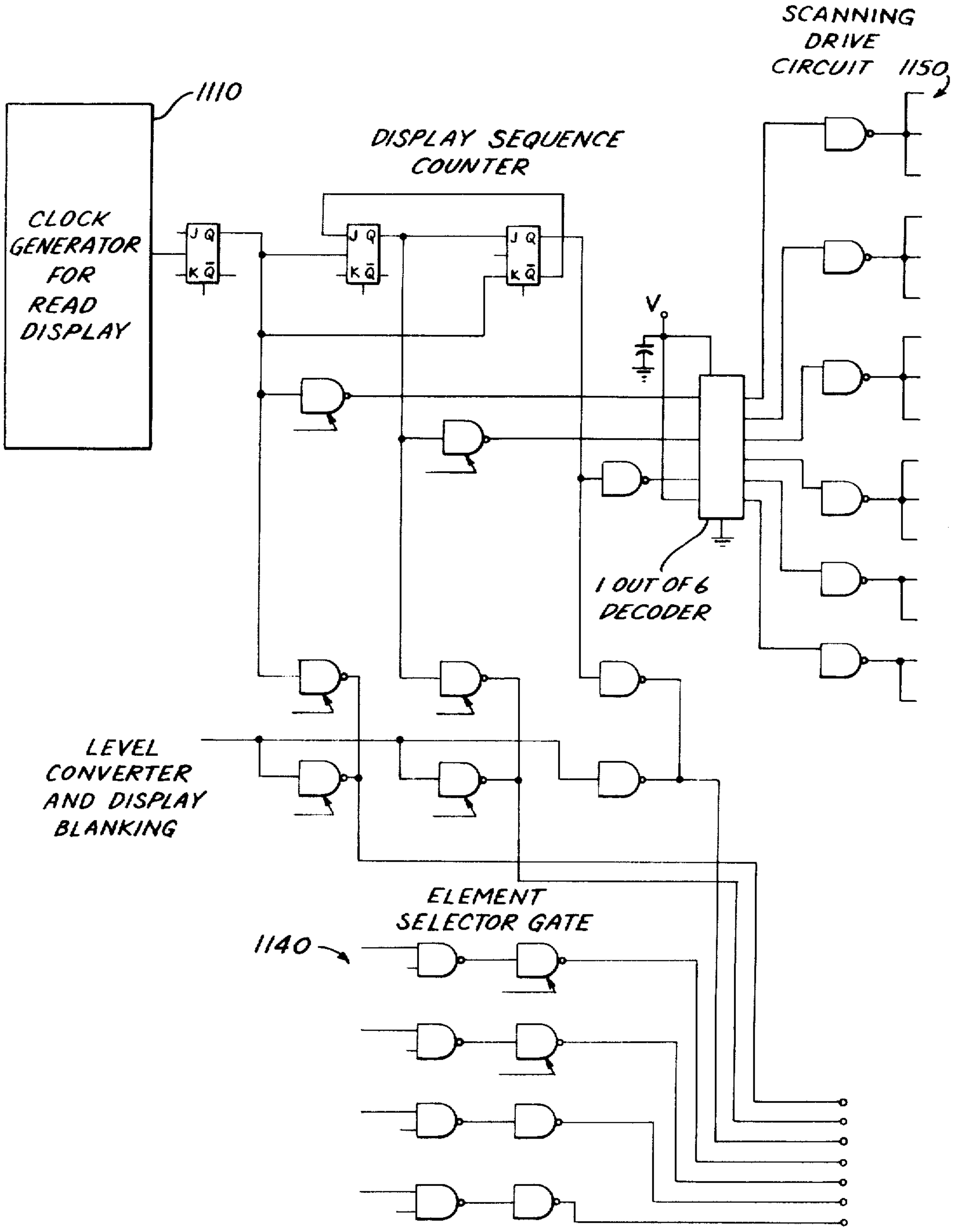

FIG. 11 illustrates a circuit which may be used for display control circuit 393 of FIG. 3 to sequentially scan the six "nixie" readout tubes as discussed above with reference to FIG. 3. A clock generator 1110 is used to control the timing of the scanning circuit and outputs 1150 are coupled to outputs 850 of FIG. 8.

FIG. 12 illustrates a comparator circuit comprising a network of NAND gates, inverters, and J-K flip-flops which may be used for set number logic 352 or sequence number logic 353 of FIG. 3. Substantially identical circuits (not shown) may be employed for the remaining digits of the set number and sequence number logic.

Thus, there has been shown and described an improved data acquisition device which is relatively simple to operate and economical to manufacture. The device of the invention provides safety features to secure the reliability of the acquired data and prevents the recording of answers to questions that for some reason may be presented out of order. Various aspects of the specific data acquisition device shown may be modified for different applications. For example, the slide projector may be replaced by a film strip projector with each frame of the film strip corresponding to the image frame of the slides. A soundtrack may be operatively associated with each frame to provide explanatory information or increase the question/answer capabilities of the device (e.g., ask questions relating to sound or music identification or preference). With relatively minor modifications, the device may be adapted to perform as a teaching machine. Using the logic circuitry and coding principles of the invention, each picture frame made be coded with information to permit the device to "know" the correct answer and compare it with the answer selected by the operator. In response to a wrong answer, the device would, for example, repeat that portion of the picture frame sequence that relates to the incorrectly answered question or show a different set of slides designated to more fully explain the matter not learned by the operator (an operation sometimes referred to as "branching") or, in response to a right answer, the device would move on to the next frame in the sequence. Alternatively, the device could respond to a wrong answer by moving on to the next frame or group of frames which, in response to a right answer, the device would skip.

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. A data acquisition system for recording on a punch card detachable from said system desired answer information supplied by an operator in response to a predetermined set of plurality of questions visually presented to the operator in a predetermined sequence by said system whereby one or more sets of said answer information may be recorded on said punch card, said card adapted for storing data corresponding to said information in the form of a predetermined coded array of holes punched in said card at a location uniquely associated with the particular question being presented, said system comprising:

- a plurality of slides corresponding to said plurality of questions, each slide bearing a picture frame having photographically recorded thereon one of said questions, a group of multiple-choice answers, and an identification code signifying the set of questions to which the particular question belongs and its relative position therein;
- a viewing screen;
- a slide projector adapted to sequentially project each of said frames in a manner such that said questions and multiple-choice answers are displayed on said screen;
- a plurality of switches respectively associated with said displayed group of multiple-choice answers for permitting the operator to answer the displayed question by closing the associated switch to thereby enter the answer information into the system;
- a digital logic register responsive to the contact closure of said switches for developing and retaining a digital signal representative of said information;
- a card punch assembly having at least one punch tool responsive to said digital signal for punching said holes in said card, said assembly also having a card carriage operable to position said card at a plurality of predetermined locations relative to said punch tool with each said location being uniquely associated with one of said displayed questions;
- photoelectric detecting means responsive to the projection of said identification code for developing a frame sequence signal representative of the relative position of said frame in said sequence;
- position sensing means for developing a card position signal representative of the position of said card relative to said punch tool;
- comparing means coupled to said detecting means and said position sensing means for developing a sequence error signal when said frame sequence signal does not correspond to said card position signal; and,
- means resPonsive to said sequence error signal for inhibiting the operation of said projector and said card punch assembly.

2. A system according to claim 1, in which said photoelectric detecting means comprises a Plurality of photoresistors positioned adjacent said viewing screen.

3. A system according to claim 2, which further comprises means for sensing improper slide projection by developIng a projection error signal whenever all said photoresistors are in the same operating state.

4. A system according to claim 3, in which said inhibiting means is also responsive to said projection error signal for inhibiting the projector and card punch assembly.

5. A system according to claim 1, in which said card position sensing means comprises a stationary yoke member having a light-emitting portion and a light-detecting portion, and a plate mounted in a fixed relation with said card carriage and adapted to move through said yoke between said light-emitting and light-detecting portions, said plate having a coded array of holes therein corresponding to said predetermined card locations, for causing said light-detecting portion to develop a card position signal representative of the position of said card relative to said card punch tool.

6. A system according to claim 1, which said photoelectric detecting means is also responsive to the projection oF said identification code for developing a frame set signal representative of the set of frames to which the projected frame belongs, comparing means for developing a set error signal when the frame set signal of the projected frame does not correspond to the frame Set signal of the immediately prior projected frame, and said inhibiting means is also responsive to said set error signal for inhibiting the operation of sai: projector and said card punch assembly.

7. A system according to claim 6, in which said photoelectric detecting means comPrises a plurality of photoresistors positioned adjacent said viewing screen.

8. A system according to claim 7, which further comprises means for sensing improper slide projection by developing a projection error signal whenever all said photoresistors are in the same operating state.

9. A system according to claim 1, which further comprises a keyboard data entry system coupled to said card punch for permitting the operator to enter additional information into the data acquisition system.

10. A system according to claim 1, which further comprises means for selectively displaying a visual indication Of said punch card locations and the position of the displayed question in the sequence.

11. A data acquisition system for recording information selected by an operator in response to a plurality of communications visually presented to the operator in a predetermined sequence by said system, comprising:

means for visually displaying said communications in said sequence;

input means adapted to permit said operator to enter said information into said system in response to each said displayed communication;

a register responsive tO said input means for developing and retaining a digital signal representative of said information;

a recording medium detachable from said device for storing data corresponding to said information said recording medium comprising a card adapted for storing said data in the form of a predetermined coded array of holes punched therein;

means including a recording transducer responsive to said digital signal for recording said data on said recording medium, said recording means operable to position said recording medium at a plurality of predetermined locations relative to said recording transducer with each of said locations uniquely associated with one of said communications, said recording means comprising a card punch assembly having at least one punch tool responsive to said digital signal for punching said holes in said card;

card position sensing means coupled to said said recording means for developing a card position signal representative of the particular location of the card relative to the punch tool; and means for synchronizing said recoding means with said visual displaying means, thereby causing the system to record the data on the recording medium at a location uniquely associated with the particular communication in the sequence being displayed by the system.

12. A system according to claim 11, which further comprises communication identification means coupled to said displaying means for developing a communication identification signal representative of the particular communication being displayed.

13. A system according to claim 12, which further comprises comparing means coupled to said card position sensing means and said communication identification means for developing an error signal when said card position signal does not correspond to said communication identification signal.

14. A system according to claim 13, which further comprises inhibiting means responsive to said error signal for preventing the operation of said displaying means to display the next communication and said card punch assembly to punch additional holes. ,31

15. A data acquisition system for recording on a recording medium detachable from said system desired data corresponding to information supplied by an operator in response to a plurality of communications visually presented to the operator in a predetermined sequence by said system, comprising:

means for visually displaying said communications in said sequence, including a set of photographic slides each bearing a picture frame having one of said communications in said sequence photographically recorded thereon, a screen, and a slide projector for sequentiallY Projecting said frames on said screen;

input means adapted to permit said operator to enter said information into said system in response to each said displayed communication;

a register responsive to said input means for developing and retaining a digital signal respresentative of said information;

means including a recording transducer responsive to said digital signal for recording said data on said recording medium, said recording means operable to position said recording medium at a plurality of predetermined locations relative to said recording transducer with each of said locations uniquely associated with one of said communications;

means for synchronizing said recording means with said visual dIsplaying means, thereby causing the system to record the data on the recording medium at a location uniquely associated with the particular communication in the sequence being displayed by the system;

means for determining that a slide is being improperly projected and developing in response thereto an inhibiting signal;

and means reeponsive to said inhibiting signal for preventing further operation of the system.

16. A data acquisition system for recording on a recording medium detachable from said system desired data corresponding to information supplied by an operator in response to a plurality of commu0ications visually presented to the operator in a predetermined sequence by said system, comprising:

means for visually dislaying said communications in said sequence;

input means adapted to permit said operator to enter said information into said system in response to each said displayed communication;

a register responsive to said input means for developing and retaining a digital signal representative of said information;

means including a recording transducer responsive to said digital signal for recording said data on said recording medium, said recording means operable to position said recording medium at a plurality of predetermined locations relative to said recording transducer with each of said locations uniquely associated with one of sAid communications;

means for synchronizing said recording means with said visual displaying means, thereby causing the system to record the data on the recording medium at a location uniquely associated with the particular communication in the sequence being displayed by the system;

and means for selectively displayinG A visual indication of said recording medium locations and the position of the displayed communication in said sequence.

* * * * *